US012607229B2

(12) United States Patent
Jin et al.

(10) Patent No.: US 12,607,229 B2
(45) Date of Patent: Apr. 21, 2026

(54) LINER FOR BEARING AND BEARING ASSEMBLY INCLUDING THE LINER

(71) Applicant: AKTIEBOLAGET SKF, Gothenburg (SE)

(72) Inventors: Tianfu Jin, Shanghai (CN); Zhangxu Zhou, Shanghai (CN); Han Wu, Shanghai (CN); Ricky Allan Burgess, Spring Lake, MI (US); Yanqin Gao, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 79 days.

(21) Appl. No.: 18/625,525

(22) Filed: Apr. 3, 2024

(65) Prior Publication Data

US 2024/0344562 A1 Oct. 17, 2024

(30) Foreign Application Priority Data

Apr. 14, 2023 (CN) .......................... 202310402856.0

(51) Int. Cl.
*F16C 19/52* (2006.01)
*F16C 35/077* (2006.01)

(52) U.S. Cl.
CPC .......... *F16C 35/077* (2013.01); *F16C 19/525* (2013.01); *F16C 2202/06* (2013.01); *F16C 2208/62* (2013.01); *F16C 2208/76* (2013.01)

(58) Field of Classification Search
CPC .... F16C 19/525; F16C 27/066; F16C 33/586; F16C 35/077; F16C 2202/06; F16C 2208/62; F16C 2208/76
See application file for complete search history.

(56) References Cited

U.S. PATENT DOCUMENTS

| | | | | |
|---|---|---|---|---|
| 4,772,139 | A * | 9/1988 | Bretton | F16C 27/04 403/29 |
| 9,611,887 | B2 | 4/2017 | Churchley | |
| 10,662,998 | B2 * | 5/2020 | Zhong | F16C 33/508 |

* cited by examiner

*Primary Examiner* — Phillip A Johnson
(74) *Attorney, Agent, or Firm* — J-TEK LAW PLLC; Scott T. Wakeman; Mark A. Ussai

(57) ABSTRACT

A liner configured to be mounted on a radially inner or outer surface of a bearing ring has a generally cylindrical base having first and second axial ends and at least one groove and at least one side wall extending radially from the first or second axial end. The liner is non-metallic and has a base portion covering the inner or outer surface of the bearing ring and a plurality of side wall sections extending radially over at least a portion of at least one axial side of the ring. The base is formed from a plurality of circumferentially adjacent axially extending subsections, each pair of which is connected by a least one hinge having a radial thickness less than a radial thickness of the base portion. Also a bearing assembly that includes a bearing housing and the bearing ring with the liner contacting the bearing housing.

20 Claims, 4 Drawing Sheets

LINER FOR BEARING AND BEARING ASSEMBLY INCLUDING THE LINER

CROSS-REFERENCE

This application claims priority to Chinese patent application no. 202310402856.0 filed on Apr. 14, 2023, the contents of which are fully incorporated herein by reference.

TECHNOLOGICAL FIELD

The disclosure is directed to a liner for a bearing and a bearing assembly including a bearing and liner.

BACKGROUND

Various kinds of bearings are widely used in various fields. One type of bearing is a thin-section bearing and is widely used in the security scanner industry and in medical devices such as CT scanners. Such a thin-section bearing usually has a very large diameter, which is often from 0.5 to 1.5 m. Referring to FIG. 1, the rotating parts of a CT scanner usually include: a frame (not shown), a pulley ring P for receiving a pulley, a rotor R, a thin-section bearing B (such as a four-contact thin-section ball bearing and an angular contact thin-section ball bearing, which can be arranged in single-row or double-row), an inner ring housing I for receiving an inner ring, and an outer ring housing O for receiving an outer ring.

However, during operation of a machine having such a bearing, the ambient temperature will change, and the temperature of the thin-section bearing and related rotating parts may usually increase partially, and there will be problems due to uneven heat transfer. The rotating parts will produce significant thermal deformation due to the load on the bearing, which will lead to high friction torque and noise problems. Specifically, the thin-section bearing often encounters high friction torque and noise problems when there is a temperature gradient inside due to environmental temperature change or heat transfer within the whole machine. Currently, the present technical field only tries to alleviate these problems by simply adjusting the mating clearances of inner ring housing/inner ring and of outer ring housing/outer ring, but it can't completely overcome these problems.

Moreover, the temperature change has a great influence on the clearance change of the thin-section bearings. Further research shows that obvious inconsistent deformation is found at the top and bottom portions of the thin-section bearings. In this case, the coupling between the outer ring housing and the bearing outer ring has the greatest influence on such deformation.

Therefore, there is a need in the present technical field for a solution that can solve the deformation variant and solve the problems of high friction torque and noise caused by the deformation.

SUMMARY

In view of the problems and demands mentioned above, the present disclosure proposes a new technical scheme, which solves the above problems and brings other technical effects by adopting the following technical features.

The disclosure is directed to a liner for mounting on an outer ring or an inner ring of a bearing, which liner comprises a base for forming a circumferential structure; at least one of the two end sides of the base has at least one side wall extending in the radial direction, and the base and the at least one side wall can be sleeved on the outer ring or the inner ring. At least one groove is formed in the base.

The disclosure also provides a bearing assembly comprising a bearing having an inner ring and an outer ring (both collectively referred to as race), an inner ring housing for accommodating the inner ring, and an outer ring housing for accommodating the outer ring. The thin-section ball bearing assembly further comprises the aforementioned liner, which is arranged between the inner ring housing and the inner ring and sleeved on the inner ring, or arranged between the outer ring housing and the outer ring and sleeved on the outer ring. Alternatively, the thin-section ball bearing assembly further comprises the aforementioned liners arranged in pairs, wherein one liner is arranged between the inner ring housing and the inner ring and sleeved on the inner ring, and the other liner is arranged between the outer ring housing and the outer ring and sleeved on the outer ring.

The above solution solves the technical problems mentioned above, and the thermal deformation of the whole structure is absorbed by providing the liner according to the present disclosure along the whole bearing circumferential direction or at a specific position in the bearing circumferential direction, while keeping the rigidity of the whole bearing at the same level. Tests prove that the solution provided by the disclosure provides lower start-up torque and rotating torque and has better noise performance. The test results show that the bearing noise can be reduced by about 10% after mounting the liner according to the disclosure.

DETAILED DESCRIPTION

Figure 1:
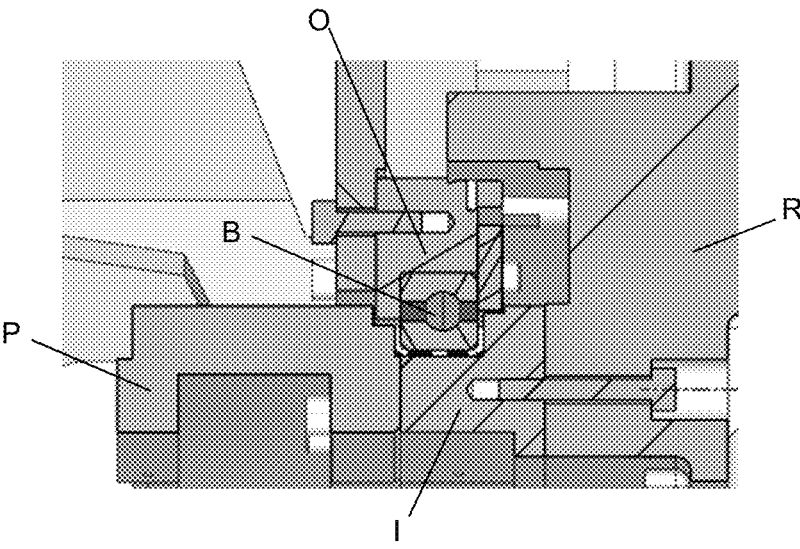
FIG. 1 is a schematic view of a bearing and its related rotating parts.

In order to make the purpose, technical scheme and advantages of the technical scheme of the present disclosure more clear, the technical scheme of the embodiment of the present disclosure will be described clearly and completely with the accompanying drawings of specific embodiments of the present disclosure. Like reference numerals in the drawings represent like parts. It should be noted that the following description relates to one or more embodiments of the present invention. Based on the described embodiments, obvious modifications and additions to the embodiments will become apparent and constitute a part of the present invention to the extent they fall within the scope of the several claims appended hereto.

Compared with the embodiment shown in the attached drawings, the feasible embodiments within the protection scope of this disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by people with ordinary skills in the field to which this disclosure belongs. The words "first", "second" and similar words used in the specification and claims of this disclosure do not indicate any order, quantity or importance, but are only used to distinguish different components. When the number of parts is not specified, the number of parts can be one or more; similarly, similar words such as "a", "the" and "the" do not necessarily mean quantity limitation. Similar words such as "include" or "comprise" mean that the elements or objects appearing before the word cover the elements or objects listed after the word and their equivalents, without excluding other elements or objects. Similar words such as "installation", "setting", "connection" or "coupling" are not limited to physical or mechanical installation, setting and connection, but can include electrical installation, setting and connection, whether directly or indirectly. "Up", "down", "left" and "right" are only used to indicate the relative orientation relationship when the equipment is used or the orientation relationship shown in the attached drawings. When the absolute position of the described object changes, the relative orientation relationship may also change accordingly.

For convenience of explanation, the circumferential direction of the bearing is called circumferential direction, the direction of the rotation axis of the bearing is called axial direction, and the direction substantially perpendicular to the axial direction is called radial direction. The term "inside/inward" refers to the direction toward the inside of the bearing; conversely, the term "outside/outward" refers to the direction toward the outside of the bearing. In addition, in different embodiments, the same reference numerals are used to refer to components having the same or similar structures and functions.

The disclosure is directed to a liner for a bearing, especially for a thin-section bearing. See FIG. 2, which is a top view, and the section view of FIG. 3 taken along the line S in FIG. 2. The liner L extends generally in the longitudinal direction X. It should be understood that this longitudinal direction X is used to describe the liner when it lays flat on a surface and is substantially strip shaped; after the liner is sleeved on (wrapped around an inner or outer cylindrical surface of) the bearing, this longitudinal direction X substantially corresponds to the circumferential direction of the bearing. Furthermore, when the liner has this substantially straight strip shape of FIG. 2, the axial direction Y is perpendicular to the longitudinal direction X within the same plane, and the radial direction Z is perpendicular to the axial direction Y and the longitudinal direction X.

The liner L includes: a base 1 for forming a circumferential structure (for example, the circumferential structure is formed by a bending operation described later); at least one side wall 2, extending from at least one of the two end sides (i.e., the axial end side) of the base 1 in the radial direction, wherein the base 1 and the side wall 2 can be sleeved on the outer ring or the inner ring; and grooves 3 (at least one) formed in the base 1. The sidewall, for example, helps to hold the liner in place, while the grooves, for example, help to bend the liner into an arc shape.

Figures 6A, 6B, 6C:
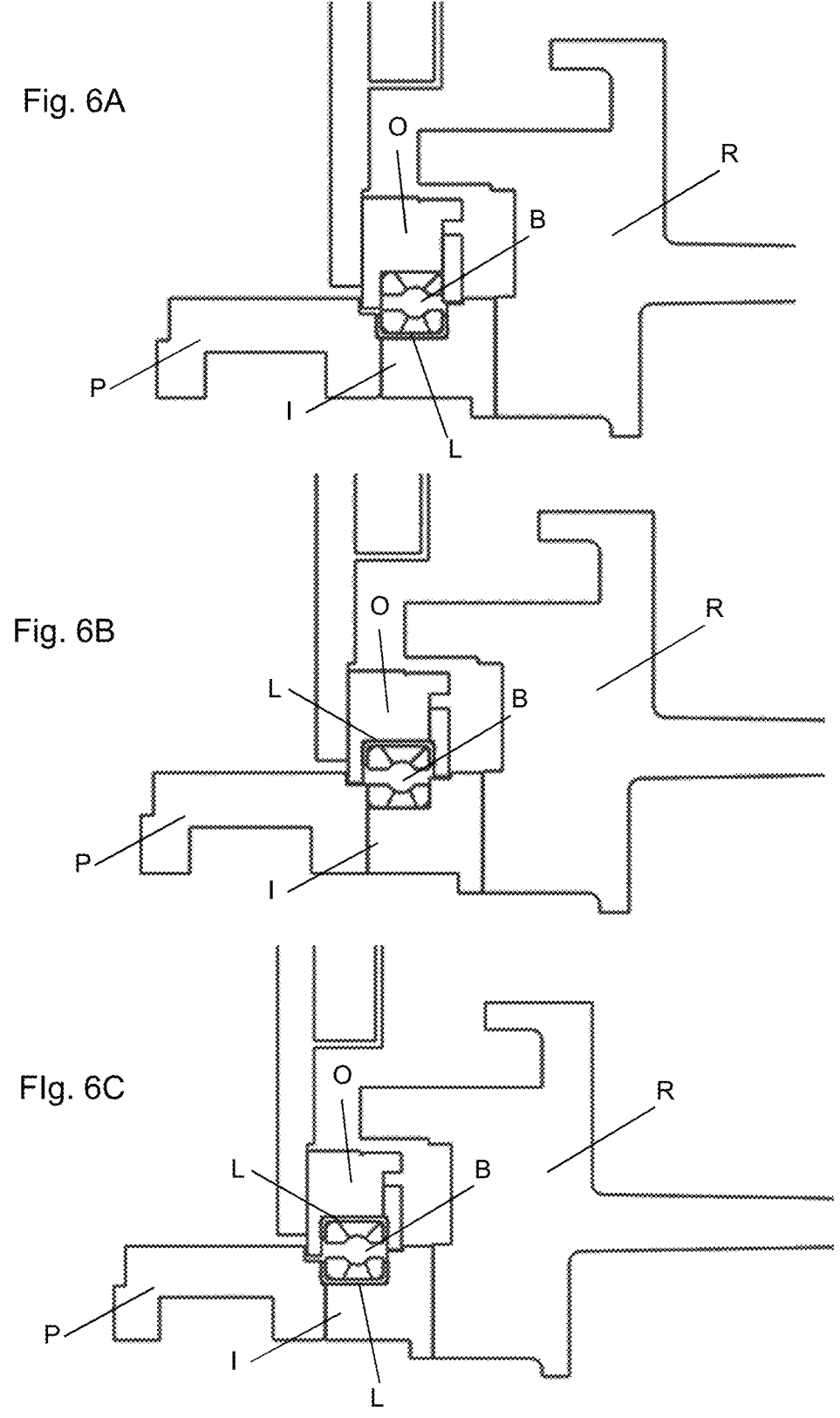
FIGS. 6A, 6B and 6C are a schematic view showing liner installation positions according to a preferred embodiment of the present disclosure of FIG. 2.

The liner according to the present disclosure may preferably be in a substantially straight strip shape when manufactured and provided in form of a roll. Preferably, the liner can be an integrally formed strip-shaped roll. When in use, one or more segments of the liner can be cut from the roll of liner according to needs, and bent into an arc shape to be sleeved on the inner ring or the outer ring of the bearing (as shown in FIGS. 6A, 6B and 6C). For example, a segment of liner roughly equal to the circumference of the bearing inner ring or outer ring can be cut from the roll and then bent into an arc shape and sleeved on the inner ring or outer ring. After the section of liner is sleeved on the bearing inner ring or outer ring, it two circumferential ends can be substantially abutted together, or the two circumferential ends can be separated to form an opening with a proper size between them. For another example, it is possible to cut a plurality of segments of liners from the roll, which, in total, are approximately equal to the circumference of the bearing, bend the segments of liners into arc shape, and then sleeve them one by one on the inner ring or the outer ring of the bearing. Besides, in addition to being sleeved along the circumferential direction of the whole bearing, one or more segments of liners can be sleeved only on individual parts of the bearing (such as on the top of the bearing and/or on the bottom of the bearing as mentioned above).

The material of the liner according to the disclosure is non-metallic and is preferably an engineering plastic such as nylon-12 (PA 12), nylon-66 (PA 66), nylon-6 (PA 6), polypropylene, polyvinyl chloride and the like. Preferably, the elastic modulus of the liner is 500 to 3,500 MPa, more preferably 1,000 to 3,000 MPa. Preferably, the thickness of the liner (including the thickness at the base, side wall, etc.) can be in the range of 1 mm to 3 mm, depending on the size of the bearing. Further preferably, as shown in FIG. 3, the radial height of the liner is 0.9 to 1.1 times the radial height (thickness) of the outer ring or the inner ring of the bearing.

Figure 2:
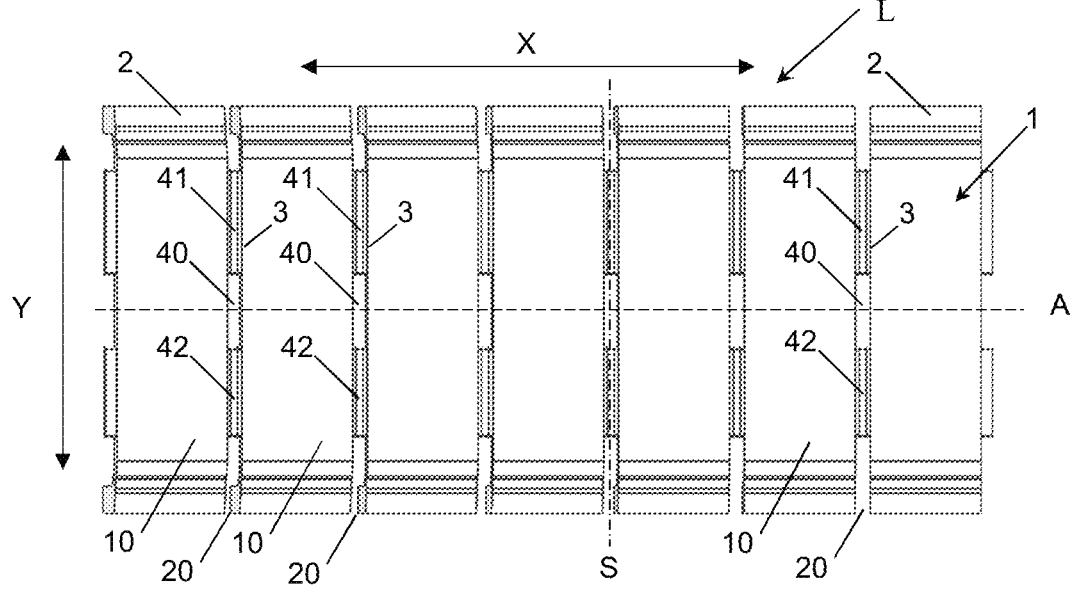
FIG. 2 is a top view of a liner according to a preferred embodiment of the present disclosure.
Figure 3:
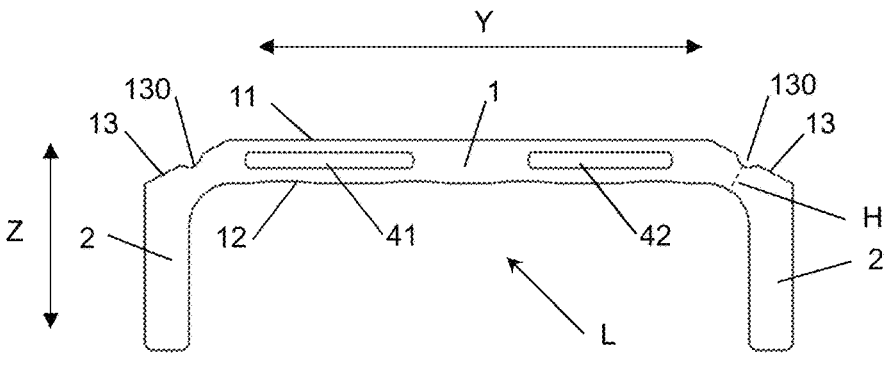
FIG. 3 is a cross-sectional view taken along line S in FIG. 2.

In addition, although preferred embodiments with multiple sidewalls 2 and multiple grooves 3 are shown in FIGS. 2 and 3, it should be understood that the liner L according to the present disclosure may include only one sidewall and one groove.

For example, in a not shown preferred embodiment, the liner may only include a single base extending longitudinally and a sidewall extending radially from the base. The one sidewall may be formed near one circumferential end of the liner, for example. Therefore, in other embodiments, the side walls are formed in a plurality, and are preferably evenly distributed in the longitudinal direction so that a better holding effect can be obtained.

According to the need, in the case of using a shorter liner, one groove can be provided. In the case of using a longer liner, a plurality of grooves can be provided. The radial depth of the groove is, for example, 50% of the thickness of the liner, for example, 0.5-2.5 mm.

Referring further to the preferred embodiment of FIGS. 2 and 3, the base 1 may include a plurality of subsections 10, and at least one of the two end sides of each subsection 10 has a sidewall 2 extending in the radial direction. According to different embodiments, the side wall(s) 2 may be one side wall extending from only one side end of one subsection, or a plurality of side walls extending from both side ends of a plurality or all subsections. In addition, there is a longitudinal thin wall between two adjacent subsections 10. It should be understood that these longitudinal thin walls are defined relative to the thickness of the base, that is, a portion with smaller thickness that of the base (for example, less than 60% of the thickness of the base). According to the inventor's research, in the case of using a plurality of liner segments and each liner segment including multiple subsections, the thermal expansion of related rotating parts during the operation of the bearing can be effectively absorbed and the noise can be significantly reduced.

Preferably, the longitudinal thin wall may include a pair of first and second longitudinal thin walls 41 and 42 (i.e., one first longitudinal thin wall 41 is paired with one second longitudinal thin wall 42). In an embodiment not shown, there can be one longitudinal thin wall formed between adjacent subsections. The longitudinal thin walls may function as hinges that facilitate the bending of the base 1 into a substantially cylindrical shape.

Further preferably, each pair of first longitudinal thin wall 41 and second longitudinal thin wall 42 is symmetrically or asymmetrically formed in the base 1 with respect to the longitudinal center line A of the base 1 and exposed through a corresponding groove of the at least one groove 3. In the preferred embodiment of FIG. 2, each pair of first longitudinal thin walls 41 and second longitudinal thin walls 42 are exposed through one same groove 3. In other words, the longitudinal thin wall can also be understood as a reduced thickness part formed in the base due to the formation of grooves.

In the preferred embodiment of FIGS. 2 and 3, a plurality of side walls 2 can extend radially from one or both axial sides of the corresponding subsection 10, and adjacent side walls 2 are separated by gaps 20. The number of side walls and the size of gaps of a certain length of liner can be adjusted according to actual needs. Forming gaps 20 between the side walls 2 facilitates bending of the liner into an arc shape.

Preferably, the at least one groove 3 can pass through the base 1 in the axial direction and communicate with the corresponding gap 20 between the side walls 2. This groove 3 and the groove deformation example described later also help to reduce the circumferential stress and expansion caused by temperature change.

According to the research and practice of the inventor, the liner of the disclosure can solve the problem of inconsistent thermal deformation in the rotating structure related to the thin-section bearing, and can realize lower friction torque when the bearing roller rotates. Moreover, the vibration caused by rotor imbalance can be reduced by the relatively flexible characteristics of the liner of the present disclosure, and the rotating noise level can be reduced.

Not only that, liners including longitudinal thin walls arranged in pairs can better resist torsion in different directions. Specifically, during the operation of the bearing, due to the temperature difference and temperature gradient among the rotating parts on both sides of the bearing (such as the pulley ring P and the rotor R of the CT scanner shown in FIG. 1) and the inner ring housing and the outer ring housing, different parts of the liner will be thermally expanded to different degrees, which will further cause uneven and inconsistent deformation and torsion of different parts of the liner. For example, referring to FIG. 3, with respect to the axial central position of this cross-section, if there is a temperature difference and temperature gradient between the left and right sides of the cross-section, the thermal expansion of the left and right sides of the liner will be inconsistent, which will lead to the deformation and even torsion of the liner. By arranging paired longitudinal thin walls on the left and right sides, this inconsistent expansion can be well dealt with and the liner can be imparted with torsion resistance. Similarly, during the operation of the bearing, there will be temperature difference and temperature gradient among different parts along the circumferential direction, and the paired longitudinal thin walls can also solve the problem of inconsistent circumferential thermal expansion. In contrast, if the liner only includes one longitudinal thin wall along the center line, the whole liner may be deformed, twisted or even torn due to inconsistent thermal expansion of different parts (whether occurred in circumferential direction or axial direction), resulting in the failure of the whole liner.

Figures 4A, 4B, 4C:
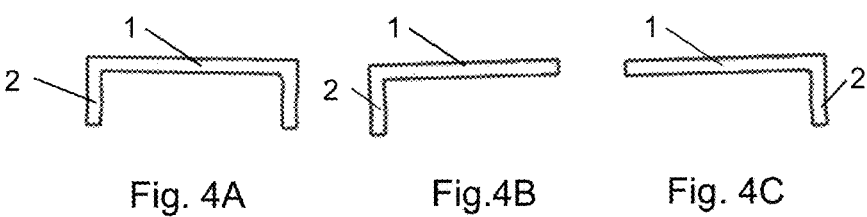
FIGS. 4A, 4B and 4C are cross-sectional views of a liner according to different preferred embodiments of the present disclosure.

Further preferably, the sidewall of the liner according to the present disclosure can also have various embodiments. As shown in FIG. 4A, the liner may include side walls 2 at both axial ends (forming a C-shaped cross-section), or as shown in FIG. 4B may include side walls 2 only on the left side or as shown in FIG. 4C may include side walls 2 only on the right side (forming an L-shaped cross section), to purposefully absorb and compensate for axial thermal deformation.

Figure 5:
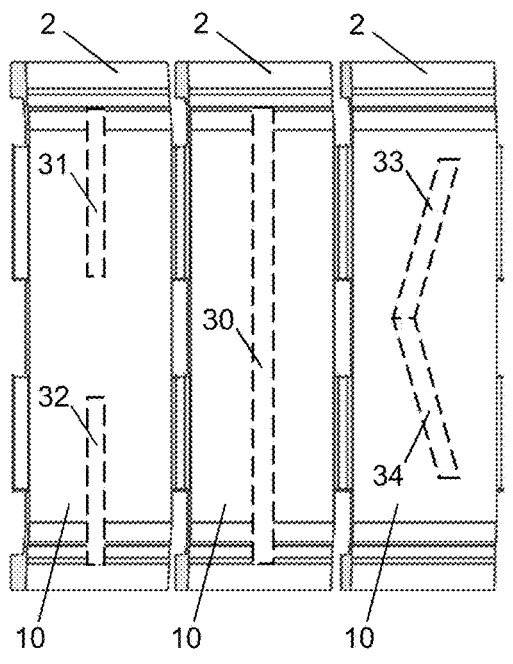
FIG. 5 is a modified example of a groove in a liner according to a preferred embodiment of the present disclosure.

Further preferably, the disclosure also provides a modified embodiment for the grooves. Referring to FIG. 5, grooves (grooves 30, 31, 32, 33, 34 described later) may be provided on corresponding ones of the plurality of subsections 10 without communicating with the gaps 20 between the plurality of sidewalls 2. In this case, there may be, but not limited to, the following modifications of the groove.

According to a modified embodiment, at least one groove 30 may be formed to extend through the corresponding subsection 10 in the axial direction. At this point, the liner may or may not include the aforementioned grooves 3.

According to another modified embodiment, grooves include first axial grooves 31 and second axial grooves 32 arranged in pairs. Each pair of first axial groove 31 and second axial groove 32 is symmetrically formed in the corresponding subsection 10 with respect to the longitudinal center line A of the base 1, and the first axial groove 31 and second axial groove 32 do not communicate with each other. It can be understood that there are a plurality of pairs of first axial grooves 31 and second axial grooves 32 between the plurality of subsections 10. Preferably, the axial length of each of the first axial grooves 31 and the second axial grooves 32 is 0.2 to 0.4 times the axial length of the corresponding subsection 10. At this point, the liner may or may not include the aforementioned grooves 3.

According to yet another modified embodiment, the grooves include first inclined grooves 33 and second inclined grooves 34 arranged in pairs, each pair of the first inclined groove 33 and the second inclined groove 34 is symmetrically formed in the corresponding subsection 10 with respect to the longitudinal center line a of the base 1 (the inclined direction can be set according to requirement), and the first inclined groove 33 and the second inclined groove 34 communicate with each other. It can be understood that there are a plurality of pairs of first inclined grooves 33 and second inclined grooves 34 between the plurality of subsections 10. Preferably, the inclination angle of each of the first inclined grooves 33 and the second inclined grooves 34 with respect to the longitudinal center line A is 25° to 75°, more preferably 45°. At this point, the liner may or may not include the aforementioned grooves 3.

These different deformation examples of the grooves can further help the liner to be bent into an arc shape and provide excellent deformation absorption and torsion resistance.

Further preferably, the above types of grooves may be formed in the outer surface 11 and/or the inner surface 12 of the base 1. In other words, according to the requirement, the longitudinal thin walls can be exposed from the outer surface of the base through different grooves arrangement, or from the inner surface of the base, or even a part of longitudinal thin walls can be exposed from the outer surface of the base and another part of longitudinal thin walls can be exposed from the inner surface of the base. Such various exposure manners can also increase the deformation absorption and torsion resistance of the liner.

Further preferably, the longitudinal thin walls may be close to the outer surface 11 of the base, or close to the inner surface 12 of the base, or located between the outer surface 11 and the inner surface 12 of the base, according to different forming ways of the grooves (FIG. 3 shows that the longitudinal thin walls are formed between the outer surface 11 and the inner surface 12).

Further preferably, referring to FIG. 2, paired first longitudinal thin walls 41 and second longitudinal thin walls 42 may be separated by a spacer 40. Specifically, the spacer 40 may be a gap penetrating the base 1 in the radial direction, or it may be a part of the base 1 itself. In the case where the spacer 40 is set as a gap, the first longitudinal thin wall 41 and the second longitudinal thin wall 42 tend to be independent from each other, so as to better resist the inconsistent thermal expansion from both axial sides and along circumferential directions of the liner to resist the liner torsion.

Further preferably, the side wall(s) 2 may be formed to be vertical or inclined inwardly with respect to the base 1. When the side wall(s) 2 incline inwardly, the side wall(s) can further improve the holding force of the liner to the inner ring/outer ring of the bearing and prevent the liner from loosening.

Further preferably, as shown in FIG. 3, the liner may further include a transition slope 13 disposed between a side wall 2 and the base 1. The transition slope 13 preferably includes a channel 130 extending in the longitudinal direction. By forming such channel 130, the left and right side walls 2 can be better connected and matched with the inner ring/outer ring of the bearing and the corresponding housing after the liner is bent into an arc shape, and the axial and radial deformation correlation caused by the thermal gradient of temperature change can be further reduced during the working process.

Preferably, as shown in FIG. 3, the minimum thickness H of the liner at the position where the channel 130 is located is 0.5-0.7 times of the thickness of the liner between the outer surface 11 and the inner surface 12 of the base 1. Preferably, various grooves 30, 31, 32, 33, 34 in the modified example of FIG. 5 can also communicate with the channel 130.

In addition, the disclosure also provides a bearing assembly, such as a thin-section bearing assembly. Referring to FIGS. 6A, 6B, 6C, the bearing assembly includes a bearing B having an inner ring and an outer ring; an inner ring housing I for accommodating the inner ring; an outer ring housing O for accommodating the outer ring.

Furthermore, the bearing assembly also includes the aforementioned liner L, which, as shown in FIG. 6A may be arranged between the inner ring housing I and the inner ring (not labeled) and sleeved on the inner ring, or as shown in FIG. 6B, may be arranged between the outer ring housing O and the outer ring (not labeled) and sleeved on the outer ring. Alternatively, as shown in FIG. 6C, the bearing assembly further comprises the aforementioned liners L arranged in pairs, wherein one liner is arranged between the inner ring housing I and the inner ring and sleeved on the inner ring, and the other liner is arranged between the outer ring housing O and the outer ring and sleeved on the outer ring.

In practical application, where to set the liner according to the disclosure can be chosen according to which side of the bearing has the greatest influence of clearance change. The radial height of the liner is preferably 0.9 to 1.1 times the radial height of the outer ring or the radial height of the inner ring.

In some preferred embodiments, the inner ring diameter of the thin-section single-row ball bearing disclosed by the present disclosure is preferably in range of 500 to 1,100 mm, the outer ring diameter is preferably in range of 520 to 1,200 mm, the axial width of the bearing inner ring and outer ring is preferably in range of 15 to 35 mm, and the diameter of the bearing roller is preferably in range of 5 to 15 mm; the inner diameter of the inner ring housing is preferably in range of 250 to 550 mm, and the outer diameter of the outer ring housing is preferably in range of 620 to 1,300 mm.

The inventors also conducted a comparative test on the bearing torque and noise level with and without the liner of the disclosure at different temperatures.

Specifically, a thin-section bearing is used in this test, and the torque test is carried out by erecting the bearing on a bench for a start-up test, which involves weighting the values obtained by dynamometer at different positions such as 0°, 90°, 180° and 270° of the bearing outer ring. The temperature is measured by electronic temperature measuring gun, and the noise is measured by an instrument at a distance of 1 m from the bearing when the bearing runs stably at 150 rpm on the bench.

Moreover, two groups of tests without liner and three groups of tests with liner were carried out for comparison. The three groups of tests with liners include: a first group of tests with liner only sleeved on the inner ring, a second group of tests with liner only sleeved on the outer ring, and a third group of tests with liners sleeved on both the inner ring and the outer ring. Three groups of tests used the liner with L-shaped cross-section as shown in FIGS. 4B and 4C. Compared with the C-shaped cross-section liner of FIG. 4A, the L-shaped cross-section liner shown in FIGS. 4B and 4C can reduce the machining cost and influence generated by the liner peripheral components due to liner adaptation.

The machine on which bearing assembly is installed in the test is a security CT machine. The test results show that:

When the temperature changes continuously from 0° C. to 23.5° C. to 40° C., compared with the test results without liner, the start-up torque (unit: N·m) can be reduced by more than 15% when the temperature is 40° C. Under the condition of continuous temperature change from 0° C. to 22° C. to 40° C., compared with the test results without liner, the start-up torque can be reduced by more than 35% in the test results with L-shaped liner only sleeved on the outer ring. Under the condition of continuous temperature change from 0° C. to 22° C. to 40° C., compared with the test results without liner, the start-up torque can be reduced by more than 30% in the test results with L-shaped liner sleeved on both the inner ring and the outer ring.

Three groups of test results show that, sleeving the L-shaped liner being only on the outer ring achieves the best comprehensive effects, significantly improving the start-up torque performance and at the same time showing better noise performance. Further research shows that, which of the embodiments—i.e. sleeving the liner on the inner ring, on the outer ring or on both the outer ring and the inner ring—is best, and which cross-sectional form of the liner is best, it depends on the specific application situation (that is, depends on the specific equipment structure, the related rotating parts, the arrangement and installation relationship of bearings, and the loading situation). This needs to be calculated according to the actual structure and verified by the actual installation test.

Figure 7A:
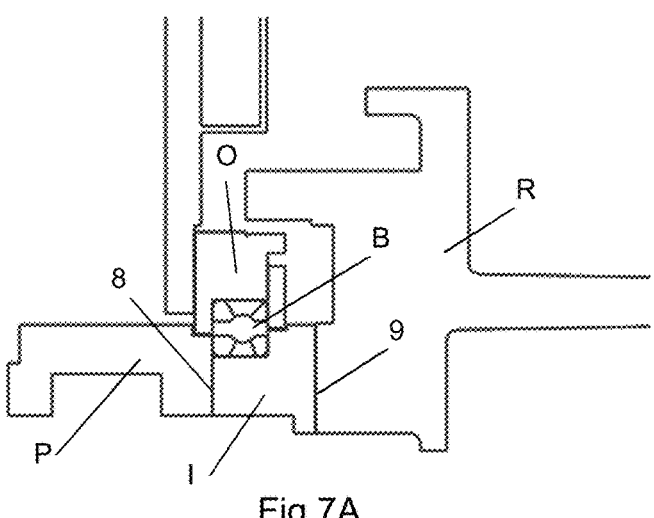
FIGS. 7A, 7B and 7C are schematic views of different embodiments of a bearing assembly according to a preferred embodiment of the present disclosure.

In addition, the disclosure also provides a further improvement on the inner ring housing I. Referring to FIG. 7A, the inner ring housing I includes a first axial end face 8 and a second axial end face 9 opposite to the first axial end face 8. Taking the CT scanner as an example, it also includes a pulley ring P and a rotor R as rotating parts. Generally, the first axial end face 8 and the second axial end face 9 abut and are in flush with the end faces of the pulley ring P and the rotor R, respectively.

Figure 7B:
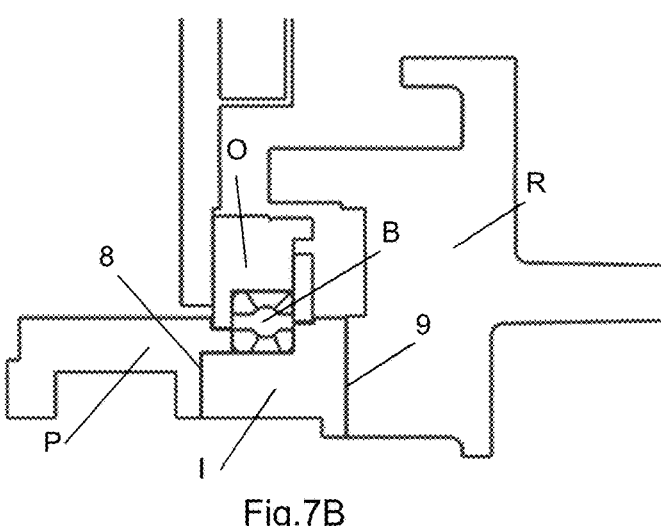

According to the preferred embodiment of the present disclosure shown in FIG. 7B, the first axial end face 8 of the inner ring housing I can extend in the axial direction and can be embedded in a rotating part coupled with it (in the case of a CT scanner, this rotating part is the pulley ring P).

Figure 7C:
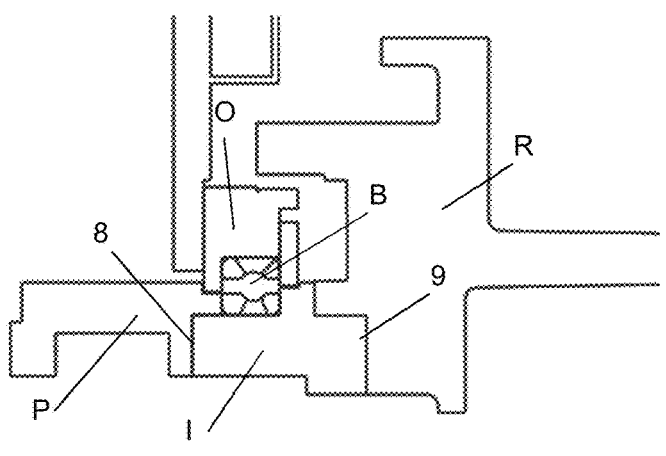

According to the preferred embodiment of the present disclosure shown in FIG. 7C, the second axial end face 9 of the inner ring housing I can also extend in the axial direction and can be embedded in the rotating part coupled with it (in the case of a CT scanner, this rotating part is the rotor R).

By improving the matching relationship between the inner ring housing and the rotating parts adjacent to it, the rigidity of these rotating parts can be further increased. Through research and practice, it is found that through this improvement, the change of environmental temperature has less influence on the deformation of the bearing, and then the friction torque and noise can be better reduced by matching with the liner according to the disclosure.

Exemplary embodiments of the present invention have been described in detail above with reference to preferred embodiments. However, those skilled in the art can understand that various variations and modifications can be made to the above specific embodiments without departing from the concept of the present disclosure, and various technical features and structures proposed in the present disclosure can be combined in various ways without exceeding the protection scope of the present disclosure, which is determined by the appended claims.

What is claimed is:

1. A bearing assembly comprising:
   a bearing ring having a radially outer surface and a radially inner surface and a first axial side surface axially spaced from a second axial side surface, and
   a first non-metallic liner having a base portion covering the radially outer surface and/or the radially inner surface and a plurality of first side wall sections extending radially over at least a portion of the first axial side surface,
   wherein the base is formed from a plurality of circumferentially adjacent axially extending subsections, each pair of circumferentially adjacent subsections being connected by a least one hinge, the at least one hinge having a radial thickness less than a radial thickness of the base portion,
   wherein each subsection includes one of the plurality of first side wall sections, and
   wherein the at least one hinge comprises a first hinge axially spaced from a second hinge by an axial through-opening.

2. The bearing assembly according to claim 1,
   including a plurality of second side wall sections extending radially over at least a portion of the second axial side surface.

3. The bearing assembly according to claim 1,
   wherein the at least one hinge is located radially between a radially outer surface of the base and a radially inner surface of the base.

4. The bearing assembly according to claim 1,
   wherein an elastic modulus of the first non-metallic liner is from 500 to 3500 MPa.

5. The bearing assembly according to claim 1,
   wherein each of the plurality of subsections has a transition surface between an outer surface of the respective side wall and an outer surface of the base, the transition surface including a circumferential groove, and
   wherein a minimum thickness of the first non-metallic liner at the groove is 0.5 to 0.7 times of a thickness of the first non-metallic liner between the outer surface of the base and an inner surface of the base.

6. The bearing assembly according to claim 1,
   including a ring housing,
   wherein the bearing assembly is mounted in the ring housing with the first non-metallic liner between an inner surface of the housing and the bearing ring or between an outer surface of the housing and the bearing ring.

7. The bearing assembly according to claim 1,
   including an outer ring housing and an inner ring housing,
   wherein the bearing ring comprises a bearing outer ring mounted in the outer ring housing with the first non-metallic liner located radially between the radially outer surface of the bearing outer ring and the outer ring housing, and
   wherein the bearing assembly includes an inner ring mounted in the inner ring housing between the outer ring and the inner ring housing with a second non-metallic liner between a radially inner surface of the inner ring and the inner ring housing, the second non-metallic liner having a base portion covering a radially inner surface of the inner ring and a plurality of first side wall sections extending radially over at least a portion of an axial side surface of the inner ring.

8. The bearing assembly according to claim 7,
   wherein the second non-metallic liner is substantially identical to the first non-metallic liner.

9. The bearing assembly according to claim 1,
   including at least one groove in a subset of the plurality of subsections, the at least one groove extending axially inward from a respective one of the plurality of first side wall sections.

10. The bearing assembly according to claim 9,
    wherein the at least one groove in the subset of the plurality of subsections axially spans the respective subsection.

11. The bearing assembly according to claim 1,
    including at least one groove in a subset of the plurality of subsections,
    wherein the at least one groove comprises a first axial groove aligned with and spaced from a second axial groove on opposite sides of a circumferential centerline of the base.

12. The bearing assembly according to claim 1,
    including at least one groove in a subset of the plurality of subsections, the at least one groove being spaced from a periphery of the each of the plurality of subsections.

13. A bearing assembly comprising:
    a bearing ring having a radially outer surface and a radially inner surface and a first axial side surface axially spaced from a second axial side surface, and a first non-metallic liner having a base portion covering the radially outer surface and/or the radially inner surface and a plurality of first side wall sections extending radially over at least a portion of the first axial side surface, wherein the base is formed from a plurality of circumferentially adjacent axially extending subsections, each pair of circumferentially adjacent subsections being connected by a least one hinge, the at least one hinge having a radial thickness less than a radial thickness of the base portion, wherein the plurality of first side wall sections are mutually spaced in the circumferential direction by first gaps, wherein the plurality of subsections of the base are mutually spaced in the circumferential direction by second gaps, wherein the first gaps are axially aligned with the second gaps, and including at least one groove in a subset of the plurality of subsections, a length direction of the at least one groove extending axially inward from a respective one of the plurality of first side wall sections.

14. The bearing assembly according to claim 13, wherein the at least one groove in the subset of the plurality of subsections axially spans the respective subsection.

15. The bearing assembly according to claim 13, wherein the at least one groove comprises a first axial groove aligned with and spaced from a second axial groove on opposite sides of a circumferential centerline of the base.

16. The bearing assembly according to claim 15, wherein, a length of the first axial groove and a length the second axial groove is 0.2 to 0.4 times an axial length of one of the subsections of the subset of the plurality of subsections.

17. The bearing assembly according to claim 13, wherein the at least one groove comprises a first groove angled at a first angle to an a circumferential centerline of the base and a second groove angled at a second angle to the circumferential centerline, wherein the first angle and the second angle are from 25° to 75°.

18. The bearing assembly according to claim 13, wherein the at least one groove faces the bearing ring.

19. The bearing assembly according to claim 13, wherein the at least one groove faces away from the bearing ring.

20. A bearing assembly comprising:

a bearing ring having a radially outer surface and a radially inner surface and a first axial side surface axially spaced from a second axial side surface, and a first non-metallic liner having a base portion covering the radially outer surface and/or the radially inner surface and a plurality of first side wall sections extending radially over at least a portion of the first axial side surface, wherein the base is formed from a plurality of circumferentially adjacent axially extending subsections, each pair of circumferentially adjacent subsections being connected by a least one hinge, the at least one hinge having a radial thickness less than a radial thickness of the base portion wherein the plurality of first side wall sections are mutually spaced in the circumferential direction by first gaps, wherein the plurality of subsections of the base are mutually spaced in the circumferential direction by second gaps, and wherein the first gaps are axially aligned with the second gaps, and including at least one groove in a subset of the plurality of subsections, the at least one groove being spaced from a periphery of the each of the plurality of subsections.

* * * * *